United States Patent
Hsieh et al.

(10) Patent No.: US 7,058,350 B2
(45) Date of Patent: Jun. 6, 2006

(54) COPIER OR SCANNER PLATEN COVER WITH FLUORESCENT COATING

(75) Inventors: Bing R. Hsieh, Webster, NY (US); Ying-wei Lin, Penfield, NY (US); Leon C. Williams, Walworth, NY (US)

(73) Assignee: Xerox Corporation, Stamford, CT (US)

(*) Notice: Subject to any disclaimer, the term of this patent is extended or adjusted under 35 U.S.C. 154(b) by 709 days.

(21) Appl. No.: 09/683,536

(22) Filed: Jan. 16, 2002

(65) Prior Publication Data

US 2003/0133172 A1 Jul. 17, 2003

(51) Int. Cl.
*G03G 15/00* (2006.01)

(52) U.S. Cl. ...................... 399/380; 358/462

(58) Field of Classification Search ............. 399/379, 399/380, 363, 16; 400/691, 692, 693; 358/462
See application file for complete search history.

(56) References Cited

U.S. PATENT DOCUMENTS

| | | | |
|---|---|---|---|
| 4,157,222 A | 6/1979 | Ishihara | |
| 4,157,412 A * | 6/1979 | Deneau | 428/147 |
| 4,172,660 A | 10/1979 | Yanofsky et al. | |
| 4,327,366 A | 4/1982 | Schafter et al. | |
| 4,338,020 A | 7/1982 | Yukawa et al. | |
| 4,386,847 A | 6/1983 | Torto et al. | |
| 4,395,115 A | 7/1983 | Tsuda et al. | |
| 4,415,261 A | 11/1983 | Yukawa et al. | |
| 4,538,185 A | 8/1985 | Wiggins | |
| 4,540,269 A | 9/1985 | Nishiyama | |
| 4,575,215 A | 3/1986 | Ariyama et al. | |
| 4,916,483 A * | 4/1990 | Thompson et al. | 355/75 |
| 5,017,963 A | 5/1991 | Tuhro | |
| 5,218,408 A | 6/1993 | Inada et al. | |
| 5,235,382 A | 8/1993 | Nehrbass | |
| 5,504,562 A | 4/1996 | Velazquez | |
| 5,745,921 A | 5/1998 | Mitchell et al. | |
| 5,754,921 A | 5/1998 | Imaizumi et al. | |
| 5,790,211 A | 8/1998 | Seachman et al. | |
| 6,166,394 A | 12/2000 | Rubscha | |
| 6,301,022 B1 * | 10/2001 | Washio et al. | 358/488 |
| 6,840,647 B1 * | 1/2005 | Hayashi et al. | 362/84 |
| 2001/0028475 A1 * | 10/2001 | Shibahara et al. | 358/462 |

* cited by examiner

*Primary Examiner*—Ren Yan
(74) *Attorney, Agent, or Firm*—Oliff & Berridge, PLC

(57) ABSTRACT

A platen cover for an imaging device such as a copier or scanner includes a substrate and at least of portion of the surface of the substrate is coated with a fluorescent coating. Preferably, the substrate has a dark or black color. The dark color of the substrate substantially reduces or eliminates show through of an image on the backside of an original document when the platen cover is not exposed to a light source for imaging. At the same time, when holes or uneven borders are present in the original document, the fluorescent coating fluoresces upon exposure to the light source at these regions of the original document, making these portions appear white in the replicated image and thereby substantially reducing or eliminating the unsightly appearance of these portions as black portions in the replicated image.

20 Claims, 2 Drawing Sheets

COPIER OR SCANNER PLATEN COVER WITH FLUORESCENT COATING

BACKGROUND OF THE INVENTION

1. Field of the Invention

The present invention relates to a platen cover for a copier or scanner. More in particular, the invention relates to a non-imageable platen cover that includes on a surface thereof a fluorescent coating.

2. Discussion of Related Art

Copiers, scanners and like devices (hereinafter referred to as imaging devices) make duplicate images from original document images by first exposing the original document image with a light source or other optical system at an imaging station. The original document is placed on a glass platen at the imaging or exposure station of the device for the exposure step. The device is provided with a platen cover that is preferably brought over the surface of the original document and glass platen at least during the exposure step.

The platen cover for a conventional document copier, scanner, etc., device is constructed of a high diffuse reflectance white surface. This high diffuse reflectance white surface is illuminated by the light source when the original document lying on the glass platen surface is scanned. By constructing the platen cover of the document scanner with a high diffuse reflectance white surface, the background of the white document and the surrounding platen cover surface presents a similar, high reflectance to the optical system and photosensor or photoreceptor below the glass platen.

The high diffuse reflectance white surface enables the conventional document scanner or copier to reduce or eliminate dark borders around the copy document, black circles where punch holes exist in the original document, and dark borders around multiple images such as multiple receipts on a single scan. Moreover, the high diffuse reflectance white surface enables the conventional document scanner to improve the contrast of the document's image by reflecting light which is transmitted through the input document.

However, use of a dark platen cover is also desirable in many instances. For example, a dark platen cover can reduce the show-through of the image on a backside of an original paper document, which is particularly important when thin paper originals are being scanned or copied. Unfortunately, if the original document has uneven borders or punched holes, use of a dark platen cover renders a duplicate image that has unsightly black borders and/or black dots/holes within the duplicate image.

One solution to the use of dark platen covers might be to eliminate unsightly borders and hole punching through image control programs that detect these portions of an original and adjust the duplicate image to eliminate these portions. However, these types of control programs are expensive and time consuming to operate.

U.S. Pat. No. 5,790,211, incorporated herein by reference in its entirety, proposes another solution. This patent describes a system and method that digitally scans a document and uses a platen cover that can switch between a high reflectance mode and a low reflectance mode. Initially, the platen cover provides a low reflectance background around the document and the scanner scans the low reflectance background and document to determine an edge of the document or to retrieve other image characteristics of the document. Subsequently, the platen cover changes so as to provide a high reflectance background around the document. The scanner then scans the high reflectance background and the document and produces digital image data relating to an image on the document. The platen cover is enabled to change to the high reflectance mode through control of a liquid crystal light located on a surface of the platen cover backing member that is adjacent to the glass platen.

What is still desired is an improved platen cover that is low in cost to manufacture, operates simply, and overcomes the deficiencies of the platen covers discussed above.

U.S. Pat. No. 5,754,921, incorporated herein by reference in its entirety, describes an original density detecting apparatus that includes a projector-receiver including a light projector and a light receiver, and a reflecting member including a fluorescent reflecting plate, a surface of which on the projector-receiver side has a coating of a fluorescent dye. An imaging apparatus includes an illuminating device for illuminating an original, an image reader for forming an image of the original on a photosensitive medium, and the original density detecting apparatus as described above. This patent does not teach or suggest a platen cover that includes a fluorescent coating on a surface thereof, the fluorescent surface in this patent being used only in conjunction with a density detection apparatus which is removed from the area where the original document is illuminated with the illuminating device. The density detection apparatus does not include a platen or platen cover, and is not located at the exposure station (light source 115) of the device.

SUMMARY OF THE INVENTION

It is therefore one object of the present invention to derive an improved platen cover for an imaging device that is low in cost to manufacture, operates simply, and overcomes the deficiencies of the platen covers discussed above.

It is a further object of the invention to develop a platen cover for an imaging device that can reduce or eliminate show-through of images on a backside of an original document while also being able to reduce or eliminate the appearance of unsightly uneven borders or hole punched areas in a scanned or copied image.

These and other objects of the invention are achieved by the present invention, which in embodiments relates to a platen cover for an imaging device, comprising a substrate having a dark color and wherein at least of portion of a surface of the substrate is coated with a fluorescent coating.

In additional embodiments of the present invention, the invention relates to an imaging device that includes an exposure station comprising a platen having a surface upon which an original document may be placed, a light source located on a side of the platen opposite the surface upon which the original document may be placed, and a platen cover adjacent the surface of the platen upon which the original document may be placed, and wherein the platen cover comprises a substrate having a surface facing the surface of the platen upon which the original document may be placed, at least of portion of the substrate surface being coated with a fluorescent coating. Such imaging device may also include a photosensor or photoreceptor that receives the light reflected from the original document for formation of a duplicate image from the image of the original document.

DETAILED DESCRIPTION OF PREFERRED EMBODIMENTS

Imaging devices, for example including copiers, scanners, and the like, are well known and conventional in the art, and thus the operation, components and functions thereof need not be, and are not, explained in detail herein.

In the art of electrophotography, for example such as used in conventional copiers, a photoreceptor (electrophotographic plate, drum, belt or the like) has an electrostatic latent image of an image from an original document formed thereon by first uniformly electrostatically charging the imaging surface of the photoreceptor. The photoreceptor is then exposed to a pattern of activating electromagnetic radiation such as light received from an original document (i.e., light reflected from the original document as exposed at the exposure station), which selectively dissipates the charge in the illuminated areas of the photoreceptor while leaving behind an electrostatic latent image in the non-illuminated area corresponding to the image of the original document. This electrostatic latent image may then be developed at one or more developing stations which apply a pre-selected colorant, for example colored toner particles, to form a visible image on the surface of the photoreceptor. The resulting visible toner image is then transferred at a transfer station directly or indirectly (for example, through the use of an intermediate transfer member) to a suitable image receiving member such as paper.

In scanners, a charge couple device (CCD) or other full width imaging array receives the light reflected from the original document at the exposure station. The imaging array is in turn conventionally electronically connected to conventional, well known, electronic digital image processing systems, devices, or chips, pre-programmed, or programmed with software, which may collectively be identified as the image processor. As is well known, the resultant electronic digital images may then be forwarded on for image compression or other processing and storage, and/or screen displays, and/or controlling a laser printer for digital printing or copying (e.g., using a photoreceptor as above), locally or at remote sites, and/or conversion to lower resolution facsimile page images for facsimile transmission, as variously discussed in the above cited and other patents, and known from commercial products. The disclosed systems may be utilized as stand-alone scanners, or combined or integrated with multi-function apparatus providing various of such functions or outputs.

Figure 1:
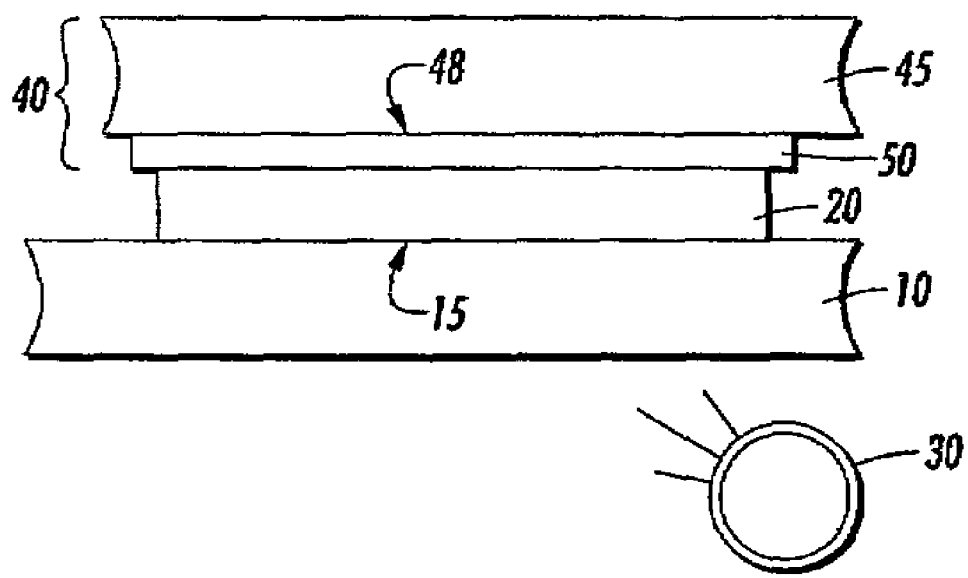
FIG. 1 is a view of an exposing station of an imaging device according to the invention.

Imaging devices such as scanners and copiers employ an exposure station where the image of an original document to be replicated for storage, printing, copying, etc., is exposed to a light source or other optical system (including electromagnetic radiation sources) so as to register a copy of the image of the original document. In copiers, for example, the image registered within the light from the light source is used in forming the electrostatic latent image upon the surface of the photoreceptor as discussed above. As illustrated in FIG. 1, the exposure station includes at least a platen 10 having a surface 15 upon which an original document 20 may be placed, a light source 30 located on a side of the platen opposite the surface 15 upon which the original document may be placed, and a platen cover 40 adjacent the surface of the platen upon which the original document may be placed.

The term "exposure station" as used herein is intended to refer to that portion of a device where a light source (optical system) that is used in exposing the image of an original document for image replication is located, i.e., the light source from which the reflected light from the original document is used in replication of the image. The exposure station will also include a platen, for example a glass platen, upon which an original document is placed (with the surface of the original document containing the original image to be replicated facing or contacting the platen surface). This definition thus excludes devices such as density detection devices that do not include platens and whose light source is not used in replication of the image (the light source only being used in a density determination, not replication or duplication of the original image itself).

The light source may be any conventional light source known to be used in the art without limitation. As but one example, an LED array may be used as the light source.

The platen is comprised of a clear material that the light from the light source can readily pass through. While a clear plastic may be used, the platen is most preferably comprised of glass.

The term "platen cover" as used herein refers to any surface having any form, so long as it is used adjacent a surface of the platen opposite a surface of the platen where the light source of the exposure station is located. Thus, the platen cover can include the outer surface of a device, for example the lid of a conventional copier, and also include a surface internal to the device, for example a continuous belt transporting an original document through the device to the exposure station/platen located within the device such as illustrated in FIG. 1 of U.S. Pat. No. 5,754,921.

Additionally, the platen cover may be rotatable or stationary. For example, where the platen cover is located at the outer surface of the device and serves as a lid, the platen cover may be rotatable between an open position removed from the surface of the platen, which allows hand placement of an original document on the surface of the platen, and a closed position adjacent the platen surface. The closed position is the preferred position during exposing of the original document for image replication. Thus, when the imaging device is in an operational mode, the platen cover is usually laid over the backside of an original image document as this input document lies upon the platen.

The platen cover of the invention is comprised of at least a substrate 45 and a fluorescent coating 50 thereon. Of course, the platen cover may include an entire assembly and include other conventional components associated therewith such as, for example, a document feeder and the like.

The substrate of the platen cover may be any color, but is preferably a dark color. Most preferably, the platen cover substrate has a black color. The substrate may be formed of any suitable material including, for example, polymeric or rubber materials. The color is achieved by including an amount of an appropriately colored colorant, such as a dye or pigment, in the material of the substrate. Thus, the substrate may be comprised of a polymer or rubber containing a dark or black color colorant, for example carbon black, therein. The color of the platen cover substrate may also be achieved by coating a colored coating, for example a polymer coating containing a colored pigment or dye, for example a dark or black colorant such as carbon black, upon a base material. Thus, as used in connection with the platen cover, the term "substrate" is intended to not only encompass a base structure, but also include a base structure including one or more colored, preferably non-fluorescent, coatings thereon.

Figure 2:
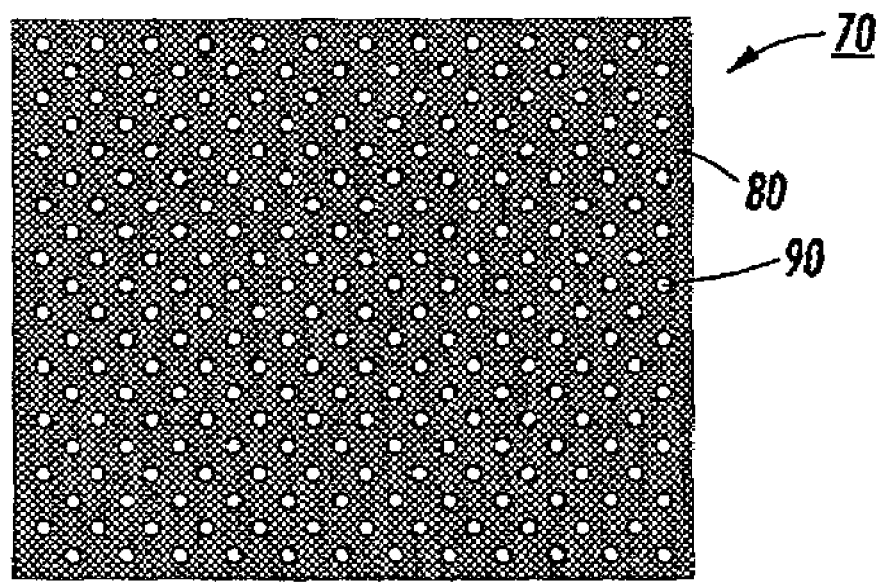
FIG. 2 illustrates a preferred pattern of the fluorescent coating upon the substrate of the platen cover of the invention.

The substrate may also have both darkly colored and light colored portions. For example, in a preferred embodiment illustrated in FIG. 2, the substrate 70 may be predominantly black (80), but may have therein a regular pattern of light color, e.g., white, spots 90. The spacing of the light color spots within the pattern can be selected (i.e., tuned) so as to optimize the light emitting properties of the fluorescent coating coated thereover. The light spots preferably are tuned to have a size and spacing such that when they are exposed, the reflected light appears uniform to the photoreceptor. The particular pattern is unimportant, as long as the result is uniform. The pattern of spots may be formed by any suitable method including, for example without limitation, forming a dark colored coating selectively upon a light colored substrate so that the white substrate shows at the patterned, uncoated portions, or selectively coating a white material in the desired pattern upon a dark colored substrate.

Upon the surface of the substrate, preferably upon the outermost surface 48 of the substrate that will face and/or contact an original document and/or the platen, is a fluorescent coating. When in the preferred embodiment the fluorescent coating is provided upon a dark colored substrate, the fluorescent coated substrate appears darkly colored when it is not directly exposed by the light source. As such, the dark colored substrate is able to effectively reduce or eliminate show through of an image on the backside of an original document. However, when the fluorescent coating is exposed by the light source, for example due to the presence of uneven edges, holes or other irregularities in the original document, the fluorescent coating photoluminesces during the light exposure, becoming an indirect light source and thus making the exposed area appear white. As a result, the uneven edges, holes and other irregularities in the original document do not appear as unsightly black regions in the replicated image, but instead are substantially removed due to the fluorescent coating making these areas of the image appear white in the replicated image. The platen cover in this preferred embodiment is thus non-imageable.

The thickness of the fluorescent coating is controlled so that the fluorescent coated platen cover remains the color of the substrate (e.g., dark or black) when not directly exposed, but sufficient to exhibit fluorescence and appear white when exposed. Preferably, the thickness of the fluorescent coating may be within the range of, for example, about 0.01 μm to about 500 μm or more.

While the fluorescent coating may coat the entire surface of the substrate, such is not necessary to accomplish the goals of the present invention. Thus, the fluorescent coating may coat only a portion of the substrate surface. Thus, for example, the fluorescent coating may be applied to only those portions of the platen cover where original document irregularities such as holes or uneven edges may most likely be expected. Also, the fluorescent coating may be applied as a pattern with sufficiently dense spacing therein such that at least some portion of the pattern will still be exposed if holes, uneven edges or other irregularities are present in an original document.

By "fluorescent" as used herein is meant a coating that fluoresces or otherwise emits light in response to exposure to the light source of the exposure station.

Any suitable fluorescent materials may be used as the fluorescent coating in the present invention. Preferably, the fluorescent coating is a fluorescent polymer coating.

Most preferably a light-emitting poly(p-phenylene vinylene) derivative having the structure

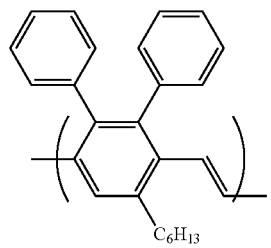

is used as the fluorescent polymer coating.

The fluorescent polymer coating may also be a fluorescent dye or pigment containing polymer, as well as polymers containing light-emitting chromophors. The fluorescent dye or pigment may preferably be selected from among 4,4'-bis (styryl) biphenyl, 2-(4-phenylstilben-4-yl) 6-butylbenzoxazole, β-methylumbelliferone, 4-methyl-7-dimethylaminocoumarin, 4-methyl-7-aminocoumarin, N-methyl-4-methoxy-1,8-naphthalimide, 9.10-bis(phenethynyl) anthracene, 5,12-bis naphthacene and the like. Polymers containing light-emitting chromophors include conjugated polymers such as poly(phenylene vinylene) derivatives and the like.

The fluorescent coating may also include any other type of additive desired. Such additives may include, for example, silica, metal oxides, etc. as light scattering enhancing agents for the fluorescent coating.

Although the invention has been described with reference to specific preferred embodiments, it is not intended to be limited thereto, rather those having ordinary skill in the art will recognize that variations and modifications may be made therein which are within the spirit of the invention and within the scope of the claims.

What is claimed is:

1. An imaging device including an exposure station comprising a platen having a surface upon which an original document may be placed, a light source located on a side of the platen opposite the surface upon which the original document may be placed, and a platen cover adjacent the surface of the platen upon which the original document may be placed, and wherein the platen cover comprises a substrate having a surface facing the surface of the platen upon which the original document may be placed, at least of portion of the substrate surface being coated with a fluorescent coating, wherein the platen cover substrate has a dark color, wherein the fluorescent coating fluoresces or emits light in response to exposure to a light source, and wherein the fluorescent coating permits the dark color of the substrate to appear when the fluorescent coating is not exposed to a light source, and the fluorescent coating fluoresces or emits light in response to the exposure to the light source so as to appear white.

2. A document imaging background member for an imaging device, comprising a substrate having a dark color and wherein at least of portion of a surface of the substrate is coated with a fluorescent coating, wherein the fluorescent coating fluoresces or emits light in response to exposure to a light source, and wherein the fluorescent coating permits the dark color of the substrate to appear when the fluorescent coating is not exposed to a light source, and the fluorescent coating fluoresces or emits light in response to the exposure to the light source so as to appear white.

3. The document imaging background member according to claim 2, wherein the substrate comprises a plastic containing a dark color pigment.

4. The document imaging background member according to claim 3, wherein the dark color pigment comprises carbon black.

5. The document imaging background member according to claim 2, wherein the fluorescent coating comprises a light-emitting polymer.

6. The document imaging background member according to claim 5, wherein the light-emitting polymer comprises a poly(p-phenylene vinylene) derivative.

7. The document imaging background member according to claim 2, wherein the fluorescent coating comprises a polymer containing a fluorescent dye, a fluorescent pigment or a light-emitting chromophor.

8. The document imaging background member according to claim 2, wherein the fluorescent coating is applied over an entire surface of the substrate.

9. The document imaging according member according to claim 2, wherein the substrate includes therein a regular pattern of white color spots.

10. A document imaging background member according to claim 2, wherein the document imaging background member is a platen cover.

11. An imaging device including an exposure station comprising a light source located at position where an original document is located during imaging, and a document imaging background member located opposite the light source and permitting the original document to be located between the light source and the document imaging background member during imaging, and wherein the document imaging background member comprises a substrate having a dark color and wherein at least a portion of a surface of the substrate facing the light source is coated with a fluorescent coating, wherein the fluorescent coating fluoresces or emits light in response to exposure to a light source, and wherein the fluorescent coating permits the dark color of the substrate to appear when the fluorescent coating is not exposed to a light source, and the fluorescent coating fluoresces or emits light in response to the exposure to the light source so as to appear white.

12. The imaging device according to claim 11, wherein the substrate comprises a plastic containing a dark color pigment.

13. The imaging device according to claim 12, wherein the dark color pigment comprises carbon black.

14. The imaging device according to claim 11, wherein the fluorescent coating comprises a light-emitting polymer.

15. The imaging device according to claim 14, wherein the light-emitting polymer comprises a poly(p-phenylene vinylene) derivative.

16. The imaging device according to claim 11, wherein the fluorescent coating comprises a polymer containing a fluorescent dye, a fluorescent pigment or a light-emitting chromophor.

17. The imaging device according to claim 11, wherein the fluorescent coating is applied over an entire surface of the substrate.

18. The imaging device according to claim 11, wherein the substrate includes therein a regular pattern of white color spots.

19. The imaging device according to claim 11, wherein the device further includes a photoreceptor upon which is to be formed an electrostatic latent image and one or more developing stations where the electrostatic latent image is developed.

20. A document imaging background member according to claim 11, wherein the document imaging background member is a platen cover.

* * * * *